US008424598B2

(12) United States Patent
Roddy (10) Patent No.: US 8,424,598 B2
(45) Date of Patent: Apr. 23, 2013

(54) MAGNETICALLY CONTROLLED DELIVERY OF SUBTERRANEAN FLUID ADDITIVES FOR USE IN SUBTERRANEAN APPLICATIONS

(75) Inventor: Craig W. Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 380 days.

(21) Appl. No.: 12/887,175

(22) Filed: Sep. 21, 2010

(65) Prior Publication Data

US 2012/0067577 A1    Mar. 22, 2012

(51) Int. Cl.
*E21B 31/06* (2006.01)
*E21B 33/13* (2006.01)

(52) U.S. Cl.
USPC .......................................... 166/248; 166/293

(58) Field of Classification Search .................. None
See application file for complete search history.

(56) References Cited

U.S. PATENT DOCUMENTS

| 6,985,750 | B1 | 1/2006 | Vicknair et al. | |
|---|---|---|---|---|
| 2005/0274454 | A1* | 12/2005 | Extrand | 156/272.4 |
| 2007/0106331 | A1 | 5/2007 | Hood et al. | |
| 2008/0149328 | A1 | 6/2008 | Lee | |
| 2008/0149335 | A1 | 6/2008 | Lee | |
| 2009/0258073 | A1 | 10/2009 | Tishin et al. | |
| 2010/0051275 | A1* | 3/2010 | Lewis et al. | 166/286 |
| 2010/0186955 | A1 | 7/2010 | Saasen et al. | |

OTHER PUBLICATIONS

Hu, et al., "Controlled Pulsatile Drug Release from a Ferrogel by a High-Frequency Magnetic Field," Macromolecules 2007, 40, 6786-6788.
Filipcsei, et al., "Magnetic Field-Responsive Smart Polymer Composites," Adv. Polymer Sci. (2007) 206: 137-189.
Lui, et al., "Magnetic-Sensitive Behavior of Intelligent Ferrogels for Controlled Release of Drug," Langmuir (2006), 22, 5974-5978.
Smith, "Cementing," Society of Petroleum Engineers Inc., Revised Edition, Second Printing, 1990.
Resendiz-Hernandez, et al., "Synthesis of Poly(Vinyl Alcohol)-Magnetite Ferrogel Obtained by Freezing-Thawing Technique", ScienceDirect—Journal of Magnetism and Magnetic Materials, http://www.sciencedirect.com, 2008.

* cited by examiner

*Primary Examiner* — Zakiya W Bates
(74) *Attorney, Agent, or Firm* — Craig W. Roddy; McDermott Will & Emery LLP (57) ABSTRACT

Methods for providing controlled delivery of subterranean fluid additives to a well bore treatment fluid and/or a surrounding subterranean environment using intelligent materials that respond to a magnetic stimulus to release subterranean fluid additives downhole in a subterranean environment. The methods include releasing a subterranean fluid additive in a subterranean formation including providing a magnetically-sensitive component that includes a subterranean fluid additive; providing a magnetic source; and releasing the subterranean fluid additive in the subterranean formation from the magnetically-sensitive component using a magnetic force generated from the magnetic source.

23 Claims, 2 Drawing Sheets

MAGNETICALLY CONTROLLED DELIVERY OF SUBTERRANEAN FLUID ADDITIVES FOR USE IN SUBTERRANEAN APPLICATIONS

BACKGROUND

The present invention relates to subterranean treatment operations, and more particularly, to providing controlled delivery of subterranean fluid additives to a well bore treatment fluid and/or a surrounding subterranean environment using intelligent materials that respond to a magnetic stimulus to release subterranean fluid additives downhole in a subterranean environment.

Natural resources such as oil and gas located in a subterranean formation can be recovered by drilling a well bore in the subterranean formation, typically while circulating a drilling fluid in the well bore. After the well bore is drilled, a string of pipe, e.g., casing, can be run in the well bore. The drilling fluid is then circulated downwardly through the interior of the pipe and upwardly through the annulus between the exterior of the pipe and the walls of the well bore, although other methodologies are known in the art.

Hydraulic cement compositions are commonly employed in the drilling, completion and repair of oil and gas wells. For example, hydraulic cement compositions are utilized in primary cementing operations whereby strings of pipe such as casing or liners are cemented into well bores. In performing primary cementing, a hydraulic cement composition is pumped into the annular space between the walls of a well bore and the exterior surfaces of a pipe string disposed therein. The cement composition is allowed to set in the annular space, thus forming an annular sheath of hardened substantially impermeable cement. This cement sheath physically supports and positions the pipe string relative to the walls of the well bore and bonds the exterior surfaces of the pipe string to the walls of the well bore. The cement sheath prevents the unwanted migration of fluids between zones or formations penetrated by the well bore.

Hydraulic cement compositions are also commonly used to plug lost circulation and other undesirable fluid inflow and outflow zones in wells, to plug cracks and holes in pipe strings cemented therein and to accomplish other required remedial well operations.

After the cement is placed within the well bore a period of time is needed for the cement to cure and obtain enough mechanical strength for drilling operations to resume. This down time is often referred to as "waiting-on-cement." If operations are resumed prior to the cement obtaining sufficient mechanical strength, the structural integrity of the cement can be compromised.

In carrying out primary cementing as well as remedial cementing operations in well bores, the cement compositions are often subjected to high temperatures, particularly when the cementing is carried out in deep subterranean zones. These high temperatures can shorten the thickening times of the cement compositions, meaning the setting of the cement takes place before the cement is adequately pumped into the annular space. Therefore, the use of set retarding additives in the cement compositions has been required. These additives extend the setting times of the compositions so that adequate pumping time is provided in which to place the cement into the desired location.

A variety of cement set retarding additives have been developed and are utilized in oil well cementing, such as sugars or sugar acids. Hydroxy carboxylic acids, such as tartaric acid, gluconic acid and glucoheptonic acid are also commonly used in oil well cementing as retarders. However, if an excess amount of retarder is used it can over-retard the set of the cement slurry, thereby causing it to remain fluid for an extended period of time. This over-retardation can result in an extended waiting-on-cement time and cause delays in subsequent drilling or completion activities.

In a number of cementing applications, aqueous salts have been utilized as an additive in cement compositions. Certain salts, such as calcium salts, can act as accelerating agents, which reduce the setting time of the cement composition in an attempt to overcome the negative effects of set retarders. However, the presence of a set and strength accelerating agent, such as calcium salt, in the cement composition can increase the risk that the cement composition may thicken or set before placement.

Given the complexity of the cement chemistry and the large temperature and pressure gradients present in the well bore, and the difficulty in predicting the exact downhole temperatures during the placement and setting of the cement, it can be difficult to control the retarding additive and accelerating agent to get the desired setting behavior. There is a need for improved set control methods, which bring about predictable cement composition setting times in the subterranean environments encountered in wells. In particular, it is desirable to develop methods for rapidly setting cement-based systems whereby the timing of the setting is under the control of technicians in the field without the risk of premature setting. Therefore, a cement that can be made to set on demand within the well bore is desirable. Such cement compositions could be useful, for example, when lost circulation zones are encountered in the subterranean formation. Setting a cement composition on demand to seal off the leak to the lost circulation zone would be desirable.

Other subterranean fluids can also benefit from the initiation of a chemical reaction downhole on demand. For example, it may be desirable to have a fluid that comprises a polymer crosslink downhole to form a pill to counteract lost circulation. The fluid could require less hydrostatic pressure for pumping, and then crosslink downhole when and where desired to form a more viscous fluid that may prevent fluid loss. Other downhole fluids and chemicals may also benefit from the ability to be activated on demand within a subterranean formation.

SUMMARY OF THE INVENTION

The present invention relates to subterranean treatment operations, and more particularly, to providing controlled delivery of subterranean fluid additives to a well bore treatment fluid and/or a surrounding subterranean environment using intelligent materials that respond to a magnetic stimulus to release subterranean fluid additives downhole in a subterranean environment.

In one embodiment, the present invention provides a method of releasing a subterranean fluid additive in a subterranean formation comprising: providing a magnetically-sensitive component that comprises a subterranean fluid additive; providing a magnetic source; and releasing the subterranean fluid additive in the subterranean formation from the magnetically-sensitive component using the magnetic source.

In one embodiment, the present invention provides a method comprising: using a magnetic source to release a subterranean fluid additive in a subterranean formation.

In one embodiment, the present invention provides a method of cementing comprising: providing a cement composition that comprises a magnetically-sensitive component;

providing a magnetic source; releasing a cement activator from the magnetically-sensitive component using the magnetic source; and allowing the cement composition to set.

In one embodiment, the present invention provides a well bore composition comprising: a well bore treatment fluid; and a magnetically-sensitive component that comprises a subterranean fluid additive.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments.

DETAILED DESCRIPTION

The present invention relates to subterranean treatment operations, and more particularly, to providing controlled delivery of subterranean fluid additives to a well bore treatment fluid and/or a surrounding subterranean environment using intelligent materials that respond to a magnetic stimulus to release subterranean fluid additives downhole in a subterranean environment.

Of the many advantages of the present invention, only a few of which are discussed or alluded to herein, the present invention provides for the use of novel intelligent materials for the magnetically controlled release of subterranean fluid additives to a well treatment fluid located downhole in a subterranean formation. The intelligent release materials of the present invention respond to the use of magnetic forces from a magnetic source to effect the release of subterranean fluid additives. The term "magnetic source" as used herein refers to a material or object that produces a magnetic force. This magnetic force is invisible, but is responsible for the most notable property of a magnet: a force that pulls on other ferromagnetic materials like iron and attracts or repels other magnets. Magnetic stimulation for release of the subterranean fluid additive is desirable because magnetic stimulation is an action-at-a-distance force (i.e., a non-contact force). The novel intelligent materials adaptively change their physical profiles due to the application of an external magnetic force, resulting in release of the contained subterranean fluid additives. This release may be advantageously employed in downhole applications to affect an immediate change in a fluid, for example, a cement composition, a gelled fluid, or a consolidating agent.

For instance, if the subterranean fluid additive is a cement activator, upon release, the activator can interact with a cement slurry in the downhole environment to provide setting of the cement slurry on demand in a desired location within a well bore or a subterranean formation. This may be useful to activate hydration of a cement composition downhole. In certain embodiments of the present invention, the release of the magnetically-sensitive component can result in a "flash-set" of at least a portion of the cement composition. As referred to herein, the teen "flash-set" will be understood to mean the irreversible setting of at least a portion of the cement composition within a time in the range of from about 1 minute to about 5 minutes after contacting the cement composition with an activator that is released from the magnetically-sensitive component.

Similarly, if the subterranean fluid additive is a crosslinking agent, the crosslinking agent can interact with polymers in a well bore treatment fluid that comprises crosslinkable polymer located downhole so as to crosslink those polymers to create a viscous pill or plug that can prevent fluid leak-off into the surrounding formation. This may be desirable, for example, to facilitate the formation of a gelled pill to prevent fluid loss into an area in a subterranean formation where a thief zone or a lost circulation zone is present. In counteracting lost-circulation problems, a lost-circulation pill prepared in accordance with the present invention may be designed to plug the perforations or formation interval losing the fluid. The viscous pill also may be useful to perform a sweep around the well bore to pick up debris or well bore fill.

An additional application is where the subterranean fluid additive is a curing agent for a consolidating agent polymer located downhole. Such applications may be useful for activating consolidating agents such as curable resins and tackifiers that may be used downhole to combat particulate migration. The curing agent may interact with the consolidating agent polymer so as to activate the polymer to enable it to consolidate particulates downhole to prevent their migration to the well bore. Curing or activating the consolidating agent polymers on-demand with a curing agent of the present invention may prevent premature curing of the polymer, which is undesirable.

Other subterranean applications for which it may be desirable to contain subterranean fluid additives until a desired reaction time may also benefit from the intelligent materials and methods of the present invention.

The term "well bore treatment fluid" as used herein refers to a fluid that is present in a subterranean formation. The subterranean formation may comprise a well bore penetrating that subterranean formation. The term "in a subterranean formation" and its derivatives as used herein does not imply any particular location in the formation other than being subsurface.

In some embodiments, the magnetically-sensitive component is a mechanically activated device, a ferrogel, or combination thereof that contains a subterranean fluid additive for release. Each of these will be discussed below.

Suitable mechanically activated devices are those that are activated by a magnetic force to cause a mechanical release of a subterranean fluid additive therefrom. An example of a mechanically activated device is a remotely controlled device that is activated by a magnetic force generated from a magnetic source so as to release a contained or enclosed subterranean fluid additive downhole. By repeating the on-off operation of the magnetic force, a controllable release of the subterranean fluid additive from the mechanically activated device can be programmably designed. In an embodiment, a system includes a remotely, magnetically controlled device and an associated controller.

Figure 1:
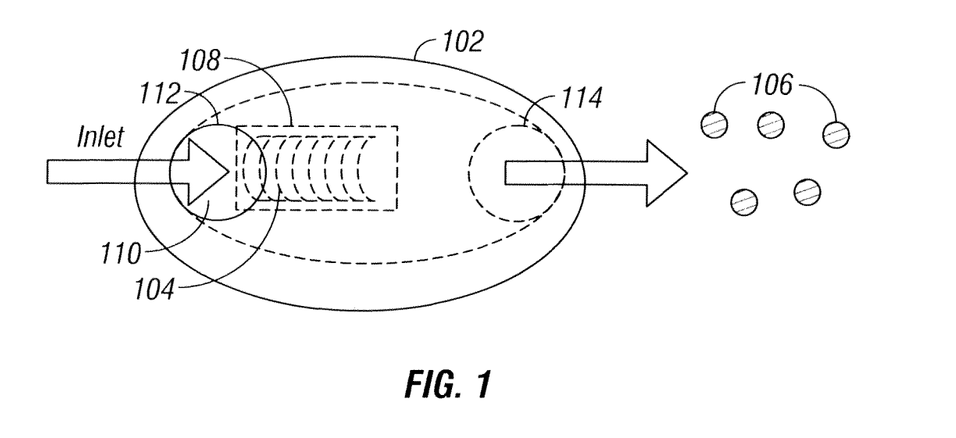
FIG. 1 illustrates an example of an embodiment of an example of a magnetically controlled device.

FIG. 1 illustrates an embodiment of an example of a magnetically activated device. This is merely an example, and should not be read to incorporate all embodiments of suitable magnetically activated devices. Shown in FIG. 1 is a body structure 102 adapted for positioning in a subterranean formation, a reaction region 104 located in the body structure, the reaction region incorporating a first subterranean fluid additive 106 (shown after release), and a remotely magnetically activatable control element 108 operably connected to the body structure and responsive to a magnetic force to release at least a portion of the subterranean fluid additive 106 from the device. Optionally, an internal space 110 may be located within the device. An embodiment may include a remote control signal source capable of generating an electromagnetic control signal sufficient to activate the remotely activatable control element to release a portion of the subterranean fluid additive 106. In some embodiments, the reaction region 104 may be in fluid communication with the surrounding environment, via an inlet 112 and/or an outlet 114, as shown in FIG. 1.

As used herein, the term "remote" refers to the transmission of information (e.g., data or control signals) or power signals or other interactions between the remote controller or the reaction system without a connecting element such as a wire or cable linking the remote controller and the reaction system, and does not imply a particular spatial relationship between the remote controller and the reaction device, which may, in various embodiments, be separated by relatively large distances (e.g., greater than about a meter) or relatively small distances (e.g., less than about a meter). In addition, remote control of the magnetically-sensitive component may be accomplished through the use of a wireless network system, for example, as that taught in U.S. Pat. No. 6,985,750, the entirety of which is hereby incorporated by reference.

According to various embodiments, a mechanically activated device is placed in an environment in order to initiate a chemical reaction in that environment. Exemplary environments include a subterranean formation, for example, to activate a cement composition, crosslink a polymer, or cure a consolidating agent.

Suitable mechanically activated devices may be placed downhole, for example, in a fluid or via a wireline or other suitable carrier. The structure of the device may be adapted for a specific environment. The size, shape, and materials of the structure influence suitability for a particular environment. For use in a subterranean environment, the device may be designed to withstand environmental conditions such as temperature, pressure, chemical exposure, erosion, abrasion, and other mechanical stresses. Moreover, the device may include features that allow it to be placed or positioned in a desired location in the subterranean formation, or targeted to a desired location in the subterranean formation. Such features may include size and shape features, tethers, or gripping structures to prevent movement of the device in the environment (in the case that the device is placed in the desired location) or targeting features (surface chemistry, shape, etc.) that may direct the device toward or cause it to be localized in a desired location in the subterranean formation.

Small devices may be constructed using methods known to those having ordinary skill in the art of microfabrication or nanofabrication. In applications where size is not a constraint, a wide variety of fabrication methods may be employed.

In some embodiments, a mechanically activated device may be formed entirely of a magnetically or an electrically responsive material or structure. In other embodiments, a mechanically activated device may include multiple magnetically responsive components (e.g., ferrous particles). For example, the mechanically activated devices may comprise ferrous materials, magnetite ($Fe_3O_4$), maghemite ($Fe_2O_3$), iron oxide nanoparticles, and combinations thereof, so as to respond to a magnetic force.

In selected embodiments, a magnetic field, an electric field, or electromagnetic control signal may be used to activate the mechanically activated device. The response of the mechanically activated device may include, but is not limited to, one or more of: heating, cooling, vibrating, expanding, stretching, unfolding, contracting, deforming, softening, or folding. The mechanically activated device may include various materials, such as polymers, ceramics, plastics, dielectrics or metals, or combinations thereof. The mechanically activated device may include a shape memory material such as a shape memory polymer or a shape memory metal, or a composite structure such as a bimetallic structure. The mechanically activated device may include a magnetically or electrically active material. Examples of magnetically active materials include permanently magnetizable materials, ferromagnetic materials such as iron, nickel, cobalt, and alloys thereof, ferrimagnetic materials such as magnetite, ferrous materials, ferric materials, diamagnetic materials such as quartz, paramagnetic materials such as silicate or sulfide, and antiferromagnetic materials such as canted antiferromagnetic materials which behave similarly to ferromagnetic materials; examples of electrically active materials include ferroelectrics, piezoelectrics and dielectrics. In some embodiments, the remotely activatable control element may include a ferrogel.

Suitable examples of mechanically activated devices that might be adapted for use in subterranean applications for the release of subterranean fluid additives are described herein in U.S. Patent Application Publication No. 2007/0106331, the entirety of which is hereby incorporated by reference.

In some embodiments, the magnetically-sensitive component is a magnetically controlled ferrogel comprising a subterranean fluid additive, whereby an external magnetic field can be used to control the release of the subterranean fluid additive from the ferrogel to the surrounding environment, for example, a well treatment fluid for initiating a desired result. The term "ferrogel" as used herein refers to a magnetically-sensitive polymer gel. The three-dimensional network structure of a ferrogel is believed to be formed from hydrogen-bond-bridges or polymer microcrystals within the gel structure. Magnetically-sensitive hydrogels can undergo quick, relatively controllable changes in shape when subjected to magnetic force because of the presence of the magnetic particles within the gel particles. When subjected to a magnetic force, the magnetic particles align so as to change the shape and/or internal molecular configuration of the ferrogel, releasing at least some of the subterranean fluid additive from the ferrogel into the desired well treatment fluid or area of a subterranean formation. In an embodiment, a ferrogel that may be used comprises a subterranean fluid additive, a polymer matrix, and magnetic particles.

Figure 2:
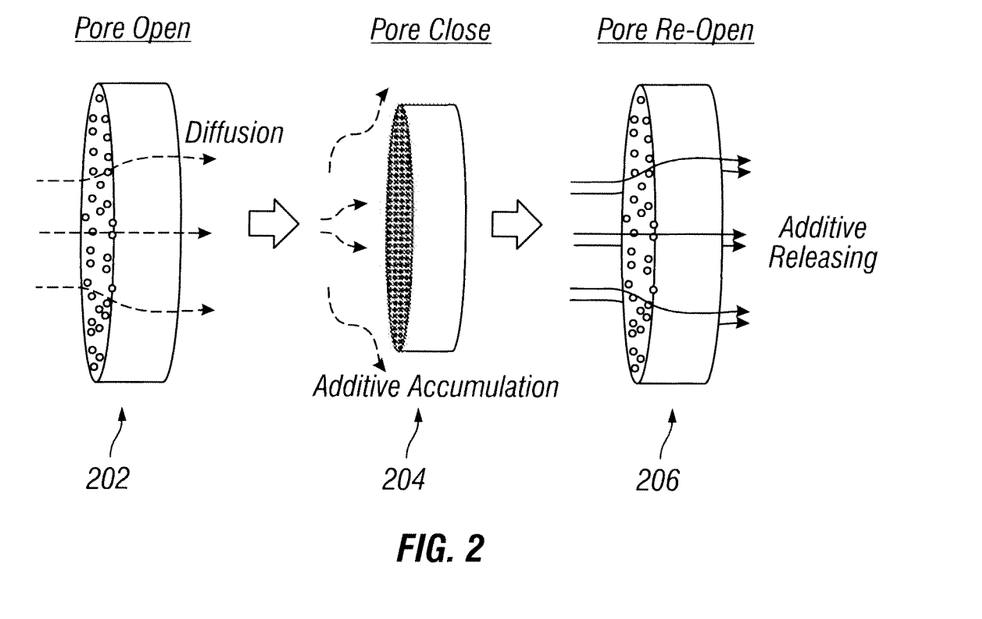
FIG. 2 represents a theoretical example of the effect of magnetic force on a ferrogel and the subterranean fluid additive release mechanism.

While not wishing to be limited by any particular theory as to how the ferrogels function to release the subterranean fluid additive, FIG. 2 shows a possible release mechanism of the subterranean fluid additive from the ferrogel when subjected to magnetic force. As shown in 202, when there is no magnetic force, the magnetic particles are randomly oriented within the polymer matrix, and the diffusion mechanism is based on the diffusion of the subterranean fluid additive through the polymer matrix. This diffusion may be related to the dissolution of the polymer matrix under downhole conditions, and the inherent diffusion rate of the subterranean fluid additive within the polymer matrix. When a magnetic applied, the magnetic moments of the magnetic particles align, generally along the magnetic fields, and are thought to produce a bulk magnetic moment. This is thought to induce the $Fe_3O_4$ particles within the ferrogel to aggregate together instantly, leading to a rapid decrease in the porosity of the ferrogel leading to a "closed configuration" as shown in 204. This closed configuration may reduce the inherent diffusion rate of the subterranean fluid additive from the ferrogel by confining the subterranean fluid additive within the network of the ferrogel. The closed configuration may also exhibit a decreased swelling ratio. When the magnetic force is removed, as shown in 206, the closed pores reopen allowing the subterranean fluid additive to move to the surfaces of the ferrogel, resulting in a burst release of the subterranean fluid additive. After the burst release, it is believed that the diffusion rate of the subterranean fluid additive from the ferrogel may be reduced to a normal diffusion profile. By repeating the on-off operation of the magnetic field, a controllable release of the subterranean fluid additive from the ferrogel can be programmably designed. The time spent switching between the on and off position of the magnetic force can control the release profile of the subterranean fluid additive.

Figure 3:
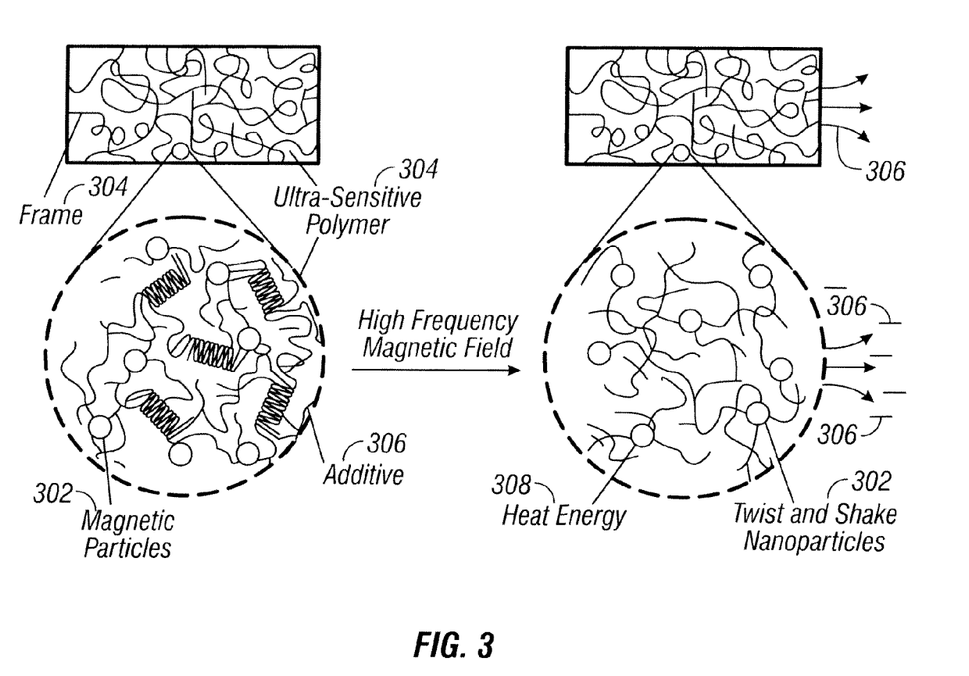
FIG. 3 represents a theoretical example of a ferrogel release of a subterranean fluid additive.

FIG. 3 illustrates another hypothetical release mechanism for the ferrogels. In FIG. 3, a schematic drawing of a ferrogel structure shows iron oxide particles 302, a polymer matrix 304, and subterranean fluid additive molecules 306. When a high frequency magnetic field is applied, the iron oxide particles 302 provide heat energy 308 to release the structures and twist and shake the polymer matrix to effectively accelerate release of the subterranean fluid additive 306. The bursting release of the subterranean fluid additive from the ferrogel is indicative of a mixture of mechanical actions imposed by the ferrogels, which may include, but are not limited to, (1) an "open" configuration of the network structure, and (2) an elastic deformation (i.e., contractile deformation) of the ferrogels, while being subject instantly to the high frequency magnetic field stimulus. Under high frequency magnetic force, the nanomagnets are activated kinetically and possibly thermally (for larger nanoparticles), and they transform the structural or molecular configurations of the ferrogels upon microstructural deformation (shrinking) of the polymer matrix.

Suitable polymers for use in the polymer matrixes of the ferrogels include, but are not limited to, poly(vinyl alcohol) ("PVA"), chitosan, gelatin, dextran, sodium polyacrylate, and acrylate polymers, and copolymers with an abundance of hydrophilic groups. PVA may be especially suitable because it displays amphoteric characteristics and can be applied in aqueous environments as well as in organic solvents for the encapsulation of subterranean fluid additives. Moreover, PVA may act as a sort of dispersing agent within the ferrogels to more uniformly disperse the magnetic particles therein.

Suitable magnetic particles include, but are not limited to, particles that may be incorporated within a ferrogel so as to allow the ferrogel to respond to a magnetic force so as to release a subterranean fluid additive from the ferrogel to a desired well bore treatment fluid or subterranean environment. Such particles commonly consist of magnetic elements such as iron, nickel and cobalt and their chemical compounds. Specific examples include, but are not limited to, ferrous materials, magnetite ($Fe_3O_4$), maghemite ($Fe_2O_3$), iron oxide nanoparticles, and combinations thereof. In an embodiment, the particles are sized to be present in an adequate concentration within the ferrogel to allow the ferrogel to respond to the magnetic force while also allowing for a sufficient concentration of the subterranean fluid additive to be present therein.

In some embodiments, the magnetic particles are nano-sized or micro-sized. If nanoparticles are used, suitable sizes for the magnetic particles may be, for example, (1) larger diameter (150-500 nm), (2) medium diameter (40-60 nm), or smaller diameter (5-10 nm). However, it is understood that the magnetic particles may comprise any suitable size or range of sizes within the range of from about 1 nm to about 1 µm. In some embodiments, the magnetic particles may be larger than about 1 µm. The magnetic particles may be fabricated from an in situ coprecipitation process. The size of the magnetic particles may affect the quantity and release profile of the subterranean fluid additive.

To determine the concentration of the subterranean fluid additive in a ferrogel for use in the methods of the present invention, a controlled release model may be developed. A release model may be realized with a predetermined release amount of the subterranean fluid additive, either as a membrane or a bulk structural configuration, via internally or externally magnetically triggered operations. In general, enough subterranean fluid additive should be used to provide the necessary action downhole relative to the treatment fluid. Considerations include, but are not limited to, the inherent diffusion rate as well as the burst release concentration and any subsequent diffusion of the subterranean fluid additive. Particle size and microstructural variations in the ferrogels may affect their release profile.

The magnetic-sensitive behaviors in the ferrogels may be further expressed by the difference in the permeated subterranean fluid additive amount between the magnetic force in an "off" mode and in an "on" mode. The magnetic force can be alternately switched on and off cyclically during a single operation to achieve a desired release rate and profile. The time period between the on and off modes may be referred to as a switching duration. The length of the switching duration may affect the release of the subterranean fluid additive from the ferrogels. Cyclic release rates may allow the subterranean fluid additive to reach a kinetically favorable distribution in the ferrogel for a subsequent burst release.

Some ferrogels that can be adapted for use in subterranean applications for the release of subterranean fluid additives are described herein in U.S. Patent Application Publication Nos. 2009/0258073 and 2007/0106331, the entirety of each is hereby incorporated by reference. Other references that describe ferrogels include the following: Hu, et al., "Controlled Pulsatile Drug Release from a Ferrogel by a High-Frequency Magnetic Field," Macromolecules 2007, 40, 6786-6788; Filipcsei, et al., "Magnetic Field-Responsive Smart Polymer Composites," Adv. Polymer Sci. (2007) 206: 137-189; and Lui, et al., "Magnetic-Sensitive Behavior of Intelligent Ferrogels for Controlled Release of Drug," Langmuir (2006), 22, 5974-5978, the entirety of each is hereby incorporated by reference. Suitable subterranean fluid additives for use in the present invention include, but are not limited to, additives that are useful in downhole operations for causing a rapid reaction in the context of a treatment fluid. Examples include, but are not limited to, cement activators, crosslinking agents, and curing agents for curable consolidating agents. The term "subterranean fluid additive" as used herein refers to a subterranean fluid additive that has utility in subterranean applications.

Examples of suitable cement activators include, but are not limited to, sodium hydroxide, sodium carbonate, an amine compound, calcium, sodium, magnesium, aluminum, calcium chloride, sodium chloride, sodium aluminate, magnesium chloride, sodium silicate, or any combination thereof. An example of a suitable calcium salt is calcium chloride. Examples of suitable sodium salts are sodium chloride, sodium aluminate, and sodium silicate. An example of a suitable magnesium salt is magnesium chloride. Other activators may include seawater and those known in the art. The choice of a proper cement activator will be made in consideration for the chemical composition of the cement composition being set.

In certain embodiments of the present invention wherein the cement composition is intended to flash-set, activators that may be particularly suitable may include, inter alia, sodium hydroxide, sodium carbonate, potassium carbonate, bicarbonate salts of sodium or potassium, sodium silicate salts, sodium aluminate salts, ferrous and ferric salts (e.g., ferric chloride and ferric sulfate), polyacrylic acid salts, and the like. In certain embodiments of the present invention, activators such as calcium nitrate, calcium acetate, calcium chloride, and calcium nitrite may be used to cause the cement composition to flash-set, though the concentration of these activators that may be required in order to cause such flash-setting may be greater than the concentration required for the other activators described herein, and their equivalents. One of ordinary skill in the art, with the benefit of this disclosure, will be able to identify an activator concentration sufficient to cause flash-setting of a cement composition.

The amount of activator generally required is an amount that is sufficient to cause the cement composition to set within a time in the range of from about 1 minute to about 2 hours after contacting the activator. In certain embodiments wherein the activator is sodium chloride, the desired effective concentration may be in the range of from about 3% to about 15% by weight of the water in the cement composition. In certain embodiments wherein the activator is calcium chloride, the desired effective concentration may be in the range of from about 0.5% to about 5% by weight of the water in the cement composition.

Although the compositions and methods of the present invention may be useful in conjunction with any cement composition that is used in a subterranean application, examples of cement compositions that may be used in conjunction with the present invention include hydraulic cement compositions. These are typically used in the form of an aqueous slurry of hydraulic cement with a concentration of retarder mixed in the aqueous slurry to control or delay the cement setting time so that it exceeds the pumping time with an adequate safety margin. Sufficient water is added to the slurry to make the composition pumpable. Such hydraulic cements, include, but are not limited to, Portland cements, pozzolana cements, gypsum cements, high-alumina-content cements, slag cements, silica cements, and combinations thereof. In certain embodiments, the hydraulic cement may comprise a Portland cement. The Portland cements that may be suited for use in exemplary embodiments of the present invention are classified as Class A, C, H and G cements according to American Petroleum Institute, Recommended Practice for Testing Well Cements, API Specification 10B-2 (ISO 10426-2), First edition, July 2005.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, a fluid loss control additive, dispersants, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, pumicite, perolite, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

Another subterranean fluid additive that may be useful in the present invention is a crosslinking agent that when released, crosslinks a gelled fluid downhole so as to increase its viscosity to form a pill. This "pill" can be useful to control fluid loss or prevent further leak-off into a particular area in a formation. The pill may have a traditional pill form, or it may form a type of plug. These gelled fluids may be aqueous-based fluids that comprise a gelling agent, which may be crosslinked. These gelling agents may be biopolymers or synthetic polymers. Common biopolymer gelling agents include, e.g., galactomannan gums, cellulosic polymers, and other polysaccharides. Because of their cost and effectiveness, biopolymers are most commonly used. However, in high temperature applications, these gelling agents can degrade, which can cause the viscosified treatment fluid to prematurely lose viscosity. Various synthetic polymer gelling agents have been developed for use in viscosified treatment fluids. The choice of a particular crosslinking agent to include will depend on the gelling agent polymer present in the gelled fluid downhole. Suitable crosslinking agents may include boron-based crosslinking agents, zirconium-based crosslinking agents and titanium-based crosslinking agents. Hafnium-based crosslinking agents also may be suitable. Zirconium-based commercially available crosslinking agents suitable for use in this invention include those available under the trade names "CL-23" and "CL-24," which are both available from Halliburton in Duncan, Okla.

In certain embodiments, the crosslinking agent may be included in a magnetically-sensitive component in an amount in the range of from about 0.02% to about 1.2% by volume of the aqueous base fluid, more preferably in the amount of about 0.5%.

Another subterranean fluid additive that may be suitable for use in the present invention is a curing agent (also known as a polymerization initiator) for a consolidating agent downhole to control, for example, particulate migration downhole. Sand consolidation is a near well bore treatment of a well to be tested or placed in production. Surrounding a well bore in many instances are incompetent highly porous and fragmentable sand or particulate formations. Under production conditions, the particulate is often displaced from its aggregated structure and carried along by a fluid flowing to a producing well. If the particulate flow is allowed to proceed unchecked the producing well bore soon becomes full of sand, thereby clogging oil production. Furthermore, particulate arriving at the surface of the well can cause wear to the production hardware.

Suitable consolidating agents comprise curable resins; tackifying agents; or a getable liquid compositions. Examples of curable resins that can be used in the present invention include, but are not limited to, organic resins such as polyepoxide resins (e.g., bisphenol A-epichlorihydrin resins), polyester resins, urea-aldehyde resins, furan resins, urethane resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F.

Generally, a curing agent used is included in an amount in the range of from about 5% to about 75% by weight of the curable resin. In some embodiments of the present invention, the resin curing agent used is included in the curable resin composition in an amount in the range of from about 20% to about 75% by weight of the curable resin.

The magnetic force used to activate the release mechanism of the magnetically-sensitive components described herein may be generated from any suitable magnetic source.

In some embodiments, the magnetic force is generated from an electromagnetic, for example, an electromagnet that is placed on a wireline and run downhole through casing. The electromagnet may also be pulled up through the casing. The magnetic force may also be generated from a more permanent magnet located on the casing or a portion of the cement shoe. In such embodiments, it may be possible to pump a cement composition past the downhole magnetic source near the casing or shoe so that the cement is then activated. The activated cement composition can then be pumped further to its desired location and allowed to set. In such embodiments, the additional pumping time after activation is taken into account so that the cement composition does not prematurely set before desired placement. In other embodiments, the magnetic source may be located at the well site above-ground. In such instances, the activated species may be activated on-the-fly and pumped downhole.

In some embodiments, the magnetic force may be generated by applying a current to an electromagnetic coil. In other embodiments, the magnetic force may be applied by a magnetic circuit.

Other examples of tools that contain magnetic sources that may be used to activate the release mechanism of the magnetically-sensitive components include, but are not limited to, MRI tools, solenoid actuators, and magnetic couplings. Examples of such downhole tools may include, but are not limited to, subterranean logging devices, flow meters, formation evaluation tools, directional drilling equipment, directional or other survey instruments, coils, gyroscopic apparatus, MRI tools, photo-multipliers, casing or tubing collar locators, information gathering and/or transmitting devices and various electrical tools.

In some embodiments, the source of the magnetic force may be located within a plug that is pumped down a casing, for example, a cementing plug. In this example, as the cementing plug proceeds downhole, the magnetic force activates the cement slurry by releasing a cement activator from a magnetically-sensitive component located downhole.

In some embodiments, the present invention provides a method comprising: using a magnetic force to release a subterranean fluid additive downhole.

In some embodiments, the present invention provides a method of releasing a subterranean fluid additive in a subterranean formation comprising: providing a magnetic source and a magnetically-sensitive component that comprises a subterranean fluid additive; and releasing the subterranean fluid additive in the subterranean formation from the magnetically-sensitive component using a magnetic force generated from the magnetic source.

In some embodiments, the present invention provides a method comprising: placing a magnetic source in a well bore penetrating a subterranean formation; and releasing a subterranean fluid additive in the subterranean formation from a magnetically-sensitive component using a magnetic three generated from the magnetic source.

In some embodiments, the present invention provides a method comprising: placing a ferrogel in a subterranean formation.

In some embodiments, the present invention provides a method comprising: placing a remotely, magnetically controlled device and an associated controller in a subterranean formation.

In some embodiments, the present invention provides well bore treatment fluids that include a ferrogel comprising a well bore subterranean fluid additive, a polymer matrix, and a magnetic species.

In some embodiments, the present invention provides well bore treatment fluids that include a magnetically-sensitive component comprising a subterranean fluid additive.

In some embodiments, the present invention provides a method of cementing in a subterranean formation: introducing a cement composition into the subterranean formation, wherein the cement composition comprises cement, a retarder, and water; providing a magnetic source and a magnetically-sensitive component that comprises a subterranean fluid additive; introducing the magnetically-sensitive component into the subterranean formation; releasing the subterranean fluid additive from the magnetically-sensitive component using a magnetic force generated from the magnetic source, wherein the subterranean fluid additive activates hydration of the cement; and allowing the cement composition to set in the subterranean formation. In some embodiments, the cement composition is placed in an annulus between casing and the subterranean formation, and is allowed to set therein.

In some embodiments, the present invention provides a method of forming a crosslinked pill in a subterranean formation: introducing a fluid comprising a crosslinkable polymer into the subterranean formation; providing a magnetic source and a magnetically-sensitive component that comprises a subterranean fluid additive; introducing the magnetically-sensitive component into the subterranean formation; releasing the subterranean fluid additive from the magnetically-sensitive component using a magnetic force generated from the magnetic source, wherein the subterranean fluid additive activates crosslinking of the polymer; and allowing a crosslinked pill to form.

In some embodiments, the present invention provides a method of consolidating particulates in a subterranean formation: introducing a fluid comprising a curable consolidating agent into the subterranean formation; providing a magnetic source and a magnetically-sensitive component that comprises a subterranean fluid additive that comprises a curing agent; introducing the magnetically-sensitive component into the subterranean formation; releasing the subterranean fluid additive from the magnetically-sensitive component using a magnetic force generated from the magnetic source; and allowing the consolidating agent to cure.

In some embodiments, the present invention provides a method of calculating the diffusion of a subterranean fluid additive from a ferrogel using a diffusion coefficient corresponding to the diffusion and release rate of the subterranean fluid additive from the ferrogel into a fluid located in a subterranean formation.

To facilitate a better understanding of the present invention, the following examples of preferred embodiments are given. In no way should the following examples be read to limit, or to define, the scope of the invention.

EXAMPLES

A suitable ferrogel for use in the present invention may be prepared according to the following prophetic method involving a freezing-thawing technique.

First, 5 wt % PVA with a molecular weight of about 72,000, and a degree of hydrolyzation of about 97.5% to about 99.5% is dissolved in 10 ml of dimethyl sulfoxide ("DMSO") at 80° C. under stirring for 6 hours and then mixed with 17 wt % of magnetic particles at 60° C. under ultrasonication for 6 h to ensure that the magnetic particles are well dispersed. The resulting solution is then poured into a plastic dish and frozen at −20° C. for 16 h. Subsequently, the gels are then thawed at 25° C. for 5 h. This cyclic process including freezing and thawing is repeated 5 times. The resulting ferrogels are then washed to removed DMSO. This is done by washing the ferrogels 5 times and then immersing them in water for 24 h. The ferrogels can be stored at 4° C. until they are used or tested.

The diffusion coefficients for the ferrogels may be measured using this prophetic procedure. The diffusion coefficients can be measured using a switching magnetic force (400 Oe) in a diffusion diaphragm cell (a side-by-side cell). The solution in the donor side is a 80 ml of an isotonic phosphate buffer ("PBS") (pH of 7.4) containing 200 ppm of the subterranean fluid additive. The receptor compartment, separated by the ferrogel, is tilled with 80 ml of PBS solution. The concentration of each compound in the receptor compartment can be determined to by $\lambda=361$ nm using a UV spectrophotometer. The diffusion coefficient can be calculated according to the following equation for the diaphragm cell:

$$\ln(C_{d0}/(C_d-C_r))=2PAt/\delta V \quad \text{Equation 1}$$

Where $C_{d0}$ is the initial concentration of the permeant in the donor compartment; $C_d$ and $C_r$ are indicative of the concentrations in the donor side and the receptor side, respectively; P is the permeability coefficient (cm2/min); A is the effective area of the ferrogel; $\delta$ is the thickness of the ferrogel; V are respectively the volumes of solution in the donor and receptor compartment (both are 80 ml above). By plotting $\ln(C_{d0}/(C_d-C_r))$ versus time (t), the permeability coefficient (P) can be calculated from the slope of the line by Equation 1. Data points may be averaged to form the plot.

A prophetic cementing example of the present invention includes providing a cementing composition that comprises a cement, water, a ferrogel including a cement activator, and optionally a set retarder; and pumping the cement composition into the annulus of a well bore located between the casing and the surrounding subterranean formation. Thereafter, at a desired time, a magnetic force is used to activate the ferrogel, enabling a release of the activator to the cement composition so that the cement composition is activated to set in a desired portion of the annulus.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of releasing a subterranean fluid additive in a subterranean formation comprising:
    providing a magnetically-sensitive component that comprises a subterranean fluid additive;
    providing a magnetic source; and
    releasing the subterranean fluid additive in the subterranean formation from the magnetically-sensitive component using a magnetic force generated from the magnetic source,
    wherein the magnetically-sensitive component is a ferrogel.

2. The method of claim 1 wherein the magnetically-sensitive component is a mechanically activated device.

3. The method of claim 1 wherein the ferrogel comprises a polymer matrix and a magnetic species.

4. The method of claim 3 wherein the polymer matrix comprises poly(vinyl alcohol).

5. The method of claim 1 wherein the subterranean fluid additive is selected from the group consisting of: a cement activator, a crosslinking agent, and a curing agent.

6. The method of claim 1 wherein the magnetic source is located on a wireline placed in a well bore penetrating the subterranean formation.

7. The method of claim 1 wherein the magnetic source comprises an electromagnet.

8. The method of claim 1 wherein the magnetic source is located within a plug that is placed in a well bore penetrating the subterranean formation.

9. The method of claim 8 wherein the plug is a cementing plug.

10. A method comprising:
    using a magnetic source to release a subterranean fluid additive in a subterranean formation,
    wherein the subterranean fluid additive is released from a ferrogel.

11. The method of claim 10 wherein the subterranean fluid additive is released from a mechanically activated device.

12. The method of claim 10 wherein the ferrogel comprises a polymer matrix and a magnetic species.

13. The method of claim 12 wherein the polymer matrix comprises poly(vinyl alcohol).

14. The method of claim 10 wherein the subterranean fluid additive is selected from the group consisting of: a cement activator, a crosslinking agent, and a curing agent.

15. The method of claim 10 wherein the magnetic source comprises an electromagnet.

16. A method of cementing comprising:
    providing a cement composition that comprises a magnetically-sensitive component;
    providing a magnetic source;
    releasing a cement activator from the magnetically-sensitive component using a magnetic force generated from the magnetic source; and
    allowing the cement composition to set,
    wherein the magnetically-sensitive component is a ferrogel.

17. The method of claim 16 wherein the magnetically-sensitive component is a mechanically activated device.

18. The method of claim 16 wherein the ferrogel comprises a polymer matrix and a magnetic species.

19. The method of claim 18 wherein the polymer matrix comprises poly(vinyl alcohol).

20. The method of claim 16 wherein the magnetic source comprises an electromagnet.

21. The method of claim 16 wherein the cement composition comprises a hydraulic cement selected from the group consisting of: Portland cement, pozzolana cement, gypsum cement, high-alumina-content cement, slag cement, silica cement, and any combination thereof.

22. The method of claim 16 wherein the cement activator activates hydration of a cement composition.

23. The method of claim 16 further comprising: placing the cement composition in a subterranean formation.

* * * * *